Figure 3:
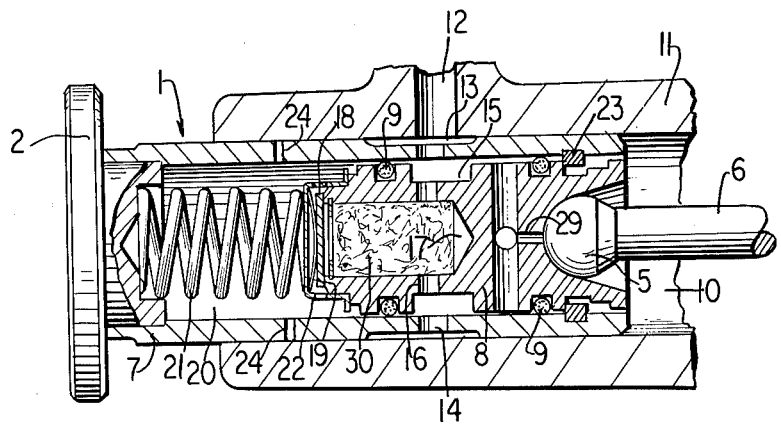

July 26, 1966 R. KUCHEN ET AL 3,262,434
SELF-ADJUSTING HYDRAULIC VALVE LIFTER FOR PISTON ENGINES
Filed Feb. 27, 1964 5 Sheets-Sheet 1
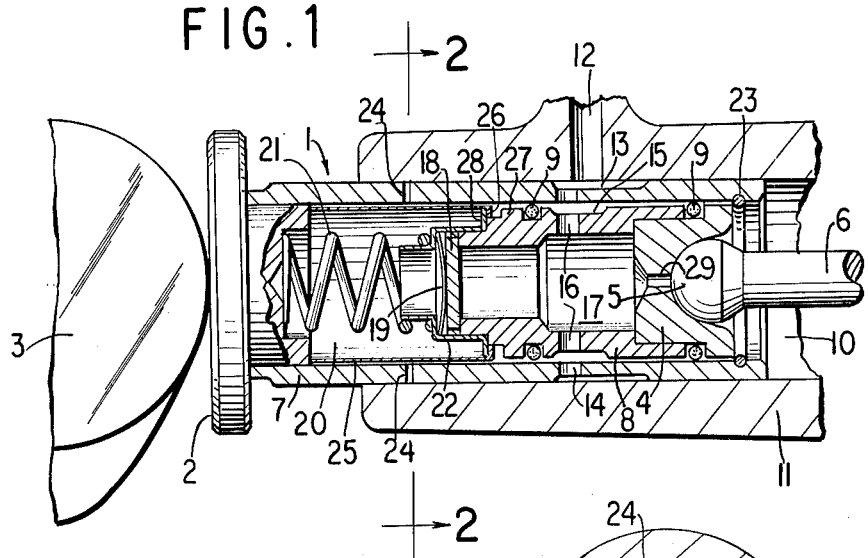
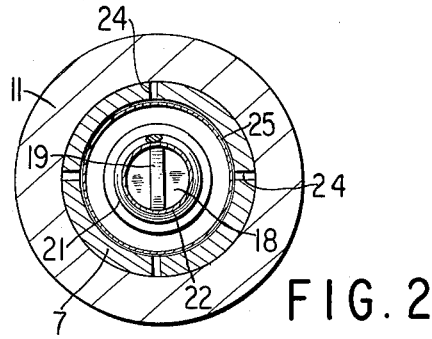
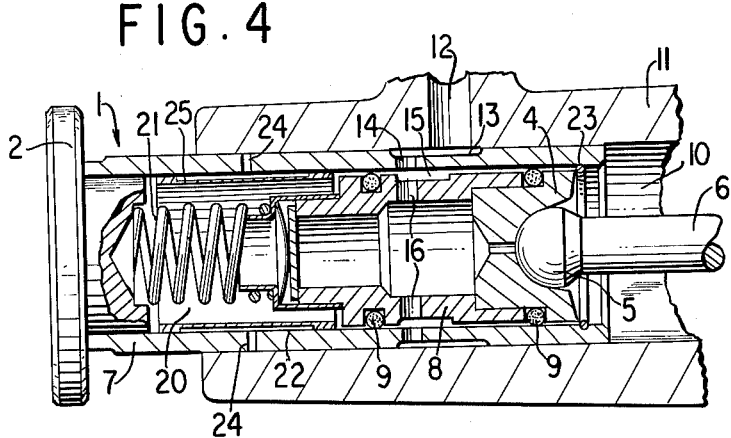
INVENTORS
RICHARD KUCHEN
HANS-JURGEN SOSSNA
BY
Hammond and Littell
ATTORNEYS

INVENTORS
RICHARD KUCHEN
HANS-JURGEN SOSSNA
BY
ATTORNEYS

July 26, 1966 R. KUCHEN ET AL 3,262,434
SELF-ADJUSTING HYDRAULIC VALVE LIFTER FOR PISTON ENGINES
Filed Feb. 27, 1964 5 Sheets-Sheet 4

INVENTORS
RICHARD KUCHEN
HANS-JURGEN SOSSNA
BY
ATTORNEYS

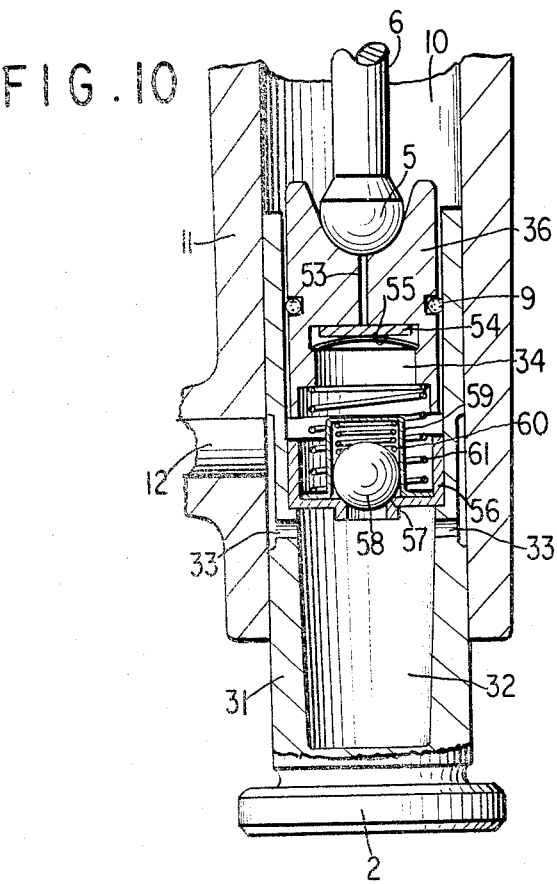
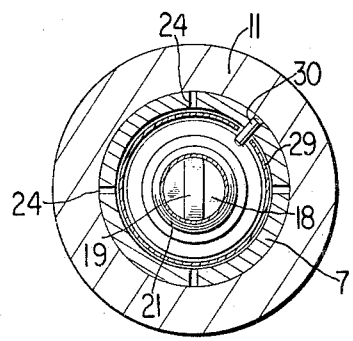
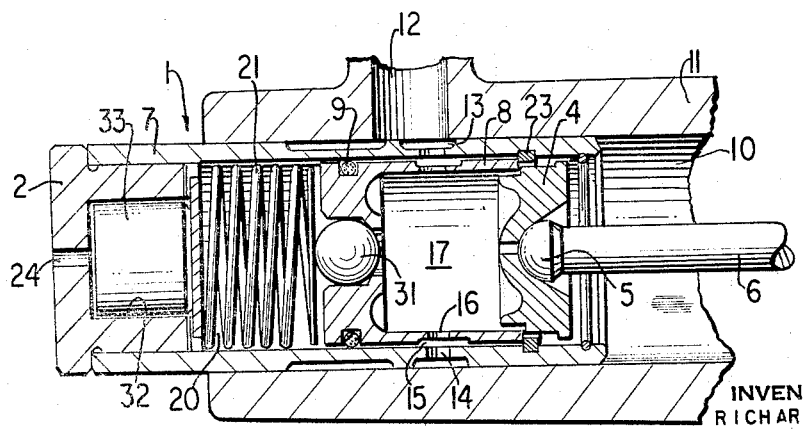

United States Patent Office 3,262,434
Patented July 26, 1966

3,262,434
SELF-ADJUSTING HYDRAULIC VALVE LIFTER
FOR PISTON ENGINES
Richard Kuchen and Hans-Jurgen Sossna, Ingolstadt, Germany, assignors to Motomak, Motorenbau, Maschinen-und Werkzeugfabrik Konstruktionen, Ingolstadt, Germany, a corporation of Germany
Filed Feb. 27, 1964, Ser. No. 347,937
Claims priority, application Germany, Mar. 2, 1963,
55,968
14 Claims. (Cl. 123—90)

The present invention relates to a self-adjusting hydraulic valve lifter for piston engines.

The valve lifter consists of two longitudinally slidable telescoped elements closed at the extreme ends thus defining a pressure chamber between them, said pressure chamber being connected through a check valve with an antechamber located in one of said elements, said antechamber in turn being supplied through bore holes with hydraulic oil from the lubricating oil circulation system of the engine.

Briefly stated, the functioning of such valve lifters is that the structural elements inserted between the valve cam and the valve stem consist of two telescoped and mutually longitudinally slidable parts, of which one cooperates with the valve cam and the other with the valve stem. The hydraulic self-adjustment of such valve lifters, so that a valve clearance of zero is achieved, is brought about by the fact that oil from the lubricating oil circulation system of the engine is introduced into the space between the two parts which form the valve lifter, and that the pressure chamber receiving this oil is closed off toward the outside by a check valve. When the two elements which form the valve lifter are forced apart so far that they abut without clearance against the valve cam on one end and against the valve stem on the other end, and when, at the same time, the pressure chamber defined by these two elements is completely filled with oil, a lifter results which practically creates a rigid coupling between valve cam and valve stem.

Although such valve lifters have actually been known for a long time, they have not heretofore been used to a significant extent in practice because their reliable operation is not assured. As the known instances of practical application of such valve lifters have shown, the reason for this is that these known lifters become useless after even a short time of operation. The underlying cause for this failure resides mainly in that the oil originating from the lubricating oil circulation system, for instance of an internal combustion engine, always carries with it some particles of contamination (such as oil carbon, abrasion fines or the like), and that this oil is practically never free from gas but instead always contains a certain amount of air.

The description of the function of such a valve lifter shows that the two mutually slidable parts which form the lifter must be easily slidable with respect to each other so that they can actually compensate at any time a clearance play that may occur, but that, at the same time, they should be lifted with respect to each other as exactly as possible in order to prevent the occurrence of sizeable oil losses in the pressure chamber.

In the previously known valve lifters the two mutually slidable parts have been telescoped into each other with so little clearance that sufficient slidability was assured on the one hand, but that, at the same time, a sufficiently good seal would be created by virtue of the small clearance. However, it is particularly in this respect that the known valve lifter designs have failed. As already mentioned above, the oil originating from the lubricating oil circulation system of an internal combustion engine always carries with it certain contaminations which, after only a short period of time, lead to clogging of the narrow slit between these two elements, so that after only a short period of time of operation the two parts could no longer be displaced with respect to each other, whereby the lifter no longer could fulfill the intended function.

It is has also been pointed out above that the available oil is never entirely free from gas. This means, however, that the volume of oil present in the pressure chamber becomes compressed to a certain degree by virtue of its gaseous components, whereby an exact adjustment of the valve lifter to eliminate clearances is no longer assured.

It is, therefore, an object of this invention to provide a self-adjusting hydraulic valve lifter which is not affected by impurities in the hydraulic fluid.

Another object is to provide a hydraulic valve lifter that does not require large replenishment of the hydraulic fluid.

A further object is to provide a hydraulic valve lifter that operates equally well under varying temperature conditions.

These and other objects of our invention will become apparent as the description thereof proceeds.

The present invention overcomes these disadvantages is simple fashion by telescoping the two parts forming the lifter into each other with relatively large clearance, so that the contaminations entrained in the oil cannot adversely affect the function, where the sealing of these parts with respect to each other is effected by elastic sealing elements and by providing at least one vent bore in the pressure chamber. Based on the fact that the two sliding elements are telescoped with relatively large clearance, the danger is eliminated that the slit between the two parts becomes clogged with contamination particles, especially oil carbon particles. The size of the contamination particles which must be expected may be derived from the size of the particles which the oil filter inserted into the oil circulation system lets pass through.

Despite the fact that both of the sliding elements are telescoped into each other with relatively large clearance, a quite satisfactory seal may be achieved by providing elastic sealing elements. Finally, by virtue of the other characteristic, namely, that the pressure chamber should comprise at least one vent bore, the present invention also prevents that the oil volume enclosed in the pressure chamber becomes compressible to a certain extent if the oil contains a certain amount of air.

In effect, such a construction would permit any air enclosed in the volume of oil in the pressure chamber to escape immediately through the vent bore. For this purpose it is necessary, however, that the vent bore be arranged in the wall of the pressure chamber at a place such that when the valve lifter is installed, the vent bore is located at the uppermost end of the pressure chamber, or that, because of the revolution of the valve lifter which occurs in operation, the vent bore is positioned at the uppermost end of the pressure chamber at short periodical intervals.

In connection with the previously known valve lifters it has also been contemplated to separate the air entrained in the oil. For this purpose vent bores have already been provided in the known valve lifters, but in contrast to the subject matter of the present invention they were not arranged in the pressure chamber but rather in the separate antechamber which is located in front of the pressure chamber and separated therefrom by a check valve. In this manner it was intended to achieve that the air present in the oil would already be separated therefrom before the oil enters into the pressure chamber itself.

Regardless of whether the previously proposed construction was at all in a position to solve this problem, those embodiments had a very serious disadvantage. When a new valve lifter is installed for the first time, the pressure chamber is initially completely filled with air which must be removed before an oil pillow can form. In those known valve lifters in which the pressure chamber does not comprise a vent bore, this is practically impossible. In the construction according to the present invention, however, the air comprised in the pressure chamber under these conditions will first escape through the vent bore until the entire pressure chamber is filled with oil. Subsequent thereto, only very minor amounts of oil can escape through the vent bore. In connection therewith it is, however, necessary that the vent bore have an extraordinarily small cross-section. In practice it will scarcely be possible to manufacture bore holes with a diameter as small as it would be required for this purpose. In accordance with the present invention, therefore, it is proposed that the wall of the pressure chamber is covered inside and/or outside in the area of the vented bore with an additional structural element, where between the wall of the pressure chamber and this additional structural element a slit of such small width is provided that an additional throttling of the vent bore results.

The structural element covering this vent bore may, for example, be formed by a sleeve mounted on the inside of the pressure chamber. However, in its simplest embodiment, the bore provided in the engine block for guidance of the valve lifter may itself take over this function.

When a sleeve mounted in the pressure chamber itself is used for this purpose, this sleeve may also be made to be so elastic that it abuts against the inner wall of the pressure chamber under the influence of the overpressure during the valve lift stroke and thereby entirely closed off the vent bore. This assures that, during the phase when the valve cam exerts a pressure upon the valve lifter, the vent bore is completely closed off so that during that time no oil at all can flow out.

Such a sleeve mounted in the pressure chamber of the valve lifter is advantageously positioned so that during operation it can displace by itself a small amount in a longitudinal direction. Under the influence of the mass forces occurring during the reciprocal motion of the valve lifter, the sleeve will always displace itself by a small amount in an axial direction, whereby a self-cleaning action of the slit between the sleeve and the pressure chamber wall is achieved because any contamination particles which may have penetrated are removed from the slit by this reciprocal displacement.

As previously mentioned the vent bore serves the purpose of bleeding off any air which may have reached the pressure chamber with the oil; because of its compressibility, this air would have a detrimental effect upon the operation of the valve lifter. When the air which is present in the pressure chamber is removed in this manner, a certain amount of oil will drain off through the vent bore during the subsequent operational sequence, especially under the action of the relatively high pressure which exists during the lift stroke of the lifter, and this oil must be replaced between each lifter stroke by re-supply from the antechamber. In order to keep that amount of drained-off oil as low as possible, an additional element is inserted before the vent bore, said element, together with the walls which define the pressure chamber, forming a throttle slot located before the vent bore. In practice, it has now been found that the amount of oil draining through the vent bore varies substantially, the reason being that the viscosity of the oil is substantially different at varying temperatures. Therefore, in a preferred embodiment of the invention, the vent bore and the throttle slot positioned in front of it must be so designed that even when the engine is started, that is, when the oil is still cold, a certain amount of oil can drain off through the vent bore. However, this has a consequence that when the engine, and with it the oil, reaches its operating temperature an undesirably large amount of oil drains off.

In order to overcome this disadvantage this additional structural element, which is located between the pressure chamber and the vent bore and forms a throttle slot together with the walls defining the pressure chamber, may be designed in such a manner that, by virtue of the properties of the material of which it is made, it produces a narrowing of the throttle slot when it is heated. By proper design it may be achieved in this manner that, despite varying temperatures of the oil, only a constant, small amount of oil drains off through the vent bore.

In one embodiment of the valve lifter, in which the vent bore is located in the cylindrical wall of the pressure chamber of the lifter and, for formation of the throttle slot, is covered by a jacket, this jacket may, for instance, be manufactured of a material which has a greater coefficient of expansion than the material of which the lifter is made. Upon heating, the jacket will then expand more than the wall of the lifter, whereby the slot formed between them will become narrower. However, in such an embodiment a jacket made of bimetallic material may also be used; but the jacket must be longitudinally slotted at one place on its circumference so that it can actually expand under the influence of heat. However, in that case it is necessary to anchor the jacket against rotation with respect to the valve lifter in order to prevent that the longitudinal slit overlies the vent bore, because then any throttling of the oil flow would be eliminated.

In accordance with another embodiment, it is possible to mount in a bore hole of one lifter component a massive cylindrical element with such dimensions that a throttle slot is formed between the wall of the bore hole and the surface of the cylindrical element, said throttle slot being positioned in front of the vent bore, and said cylindrical element having a greater coefficient of expansion than the valve lifter part surrounding it. The effect of the embodiment is practically the same as that of the embodiment described above.

A relatively simple possibility for the separation of contamination particles is also provided by installing a filter in the antechamber. This filter may, for example, consist of sintered ceramic or plastic particles. Finally, it should also be pointed out that the elastic sealing elements which effect the seal between the two parts of which the valve lifter consists may be formed in simple and effective fashion by annular rope rings which are seated in annular grooves of one of the two sliding elements. It has been found that these annular rope rings provide an extremely simple and yet satisfactory seal.

The drawings represent various embodiments of the present invention described above. Of these FIG. 1 is a longitudinal cross-sectional view of a valve lifter according to the present invention for horizontal installation, FIG. 2 is a section along line 2—2 of FIG. 1, FIGS. 3 to 8 are additional longitudinal sections through various valve lifters according to the present invention for horizontal installation, and FIGS. 9 and 10 are longitudinal cross-sectional views of valve lifters according to the present invention for vertical installation, FIG. 11 is a section along line 2—2 of FIG. 1 showing a variation in the throttling sleeve, and FIG. 12 is a longitudinal cross-sectional view of another embodiment of the valve lifter.

In FIG. 1, valve lifter 1 comprises of a casing 7 which is closed off at one end by a valve plate 2 and of a slidable element 8 which is connected with the ball socket 4 into a single rigid element. Plate 2 of valve lifter 1 abuts against valve cam 3 at one end, and at the other end it abuts through ball socket 4 against the spherical end of valve stem 6. The two elements 7 and 8 are telescoped into each other in longitudinally slidable fashion with a relatively large clearance and are sealed with respect to each other by annular rope rings 9. The casing 7 is also longitudinally slidably mounted in a bore 10 of engine block 11.

Engine block 11 comprises a lubricating oil channel 12 which terminates in bre 10, said lubricating oil channel being connected to the oil circulation system of the engine. In the area in which channel 12 terminates in bore 10, the casing 7 is provided with a circumferential depression 13 on its outer circumference. In the area of this depression casing 7 also comprises a plurality of bore holes 14 uniformly distributed over the circumference. In similar fashion, in the area where these bore holes terminate, the sliding element 8 guided within casing 7 is provided with a circumferential groove 15, and in the area of this groove 15 the sliding element is also provided with a plurality of bore holes 16 uniformly distributed over its circumference. Finally, these bore holes 16 terminate in antechamber 17 located within the sliding element 8, said antechamber being radially defined by the sliding element 8 and axially by socket 4 on one end and by valve plate 18 on the other end.

Valve plate 18, which is under the action of a leaf spring 19, closes the antechamber 17 off against the pressure chamber 20 which in turn is located within casing 7. Sleeve 22, which may for example be drawn from sheet metal, serves to seat the valve plate 18 and leaf spring 19. Within the pressure chamber 20 a coil spring 21 is mounted which tends to force apart the two axially mutually slidable parts 2 and 7 on the one hand and 4 and 8 on the other hand. The most extreme sliding position is determined by a ring 23 located in the bore of casing 7 against which ball socket 4 abuts.

Casing 7 comprises, as shown in FIG. 2, four vent bores 24 uniformly distributed over the circumference of the casing in the area of pressure chamber 20. Within pressure chamber 20 a sleeve 25 is also mounted in such a fashion that the sleeve covers vent bores 24 and at the same time forms a narrow slit with the inner wall of the pressure chamber 20. Finally, the sleeve 25 is held, by means of its flange 26, between a shoulder 27 on sliding element 8 and a flange 28 on sleeve 22. The space between flange 28 and shoulder 27 is greater than the thickness of flange 26 so that sleeve 25 can displace in axial direction by a small amount.

FIG. 2 is a cross-section of the valve lifter along lines 2—2 in FIG. 1 and shows particularly the arrangement of the vent bores 24 in casing 7.

For an explanation of the function of this valve lifter it is initially assumed that antechamber 17 as well as pressure chamber 20 and the associated feed bores 12, 14 and 16 are completely filled with oil. Coil spring 21 forces apart the two principal parts of which the valve lifter consists, until the plate 2 abuts against cam 3 on the one hand and ball socket 4 abuts against the spherical end 5 of valve stem 6 on the other hand. The valve plate 18 of the check valve is forced against its seat on the forward surface of sliding element 8 by leaf spring 19.

Thus, a certain volume of oil is enclosed in pressure chamber 20 between the two principal parts which form the valve lifter. When valve cam 3 exerts a pressure upon plate 2, practically the entire valve lifter 1 will move toward the right as a rigid coupling member and will displace valve stem 6 by a corresponding amount.

A small amount of oil will constantly leave pressure chamber 20 through vent bores 24, but this amount of oil will be replenished from antechamber 17 through the check valve formed by valve plate 18 and leaf spring 19, and the oil withdrawn from the antechamber will in turn again be replenished with a corresponding amount of oil through bores 12, 14 and 16 from the lubricating oil circulation system.

If the oil present in pressure chamber 20 comprises air or gas admixed therewith, this air or gas will separate in the upper portion of the pressure chamber 20 and will there be vented off through that vent bore 24 which is in uppermost position. A total of four vent bores 24 uniformly distributed over the circumference are provided in the embodiment shown in FIGS. 1 and 2. When it is considered that the valve lifter constantly rotates, it will be sufficient in practice to provide two and possibly even only one vent bore because it will continually return to the uppermost location of pressure chamber 20 so that any air which may be present can be vented off. The ball socket 4 is at the same time supplied with oil from antechamber 17 through a bore 29, the oil serving to lubricate the spherical end 5 of valve stem 6.

The valve lifter embodiment shown in FIG. 3 corresponds essentially to that shown in FIGS. 1 and 2. The only differences are that in this embodiment the sliding element 8 itself contains the ball socket. Moreover, the sleeve 25, which is supposed to provide a throttling of vent bores 24 is omitted. In the embodiment according to FIG. 3 this throttling is instead achieved exclusively by bore 10 in the engine block which covers the outer wall of casing 7 in the area of vent bores 24. Finally, a change has been made over the previously described valve lifter inasmuch as almost the entire antechamber 17 is filled by a filter 30 for the purpose of preventing contamination particles from reaching the pressure chamber.

The embodiment shown in FIG. 4 comes substantially closer to that shown in FIG. 1 because here the only difference consists practically in that sleeve 25, which is located in pressure chamber 20 and covers vent bores 24, is rendered elastic in its middle portion by a weakening of its cross-section so that it lies up against the wall of pressure chamber 20 under the action of the excess pressure during the lift stroke of the valve and thereby closes off the vent bores 24.

Figure 5:
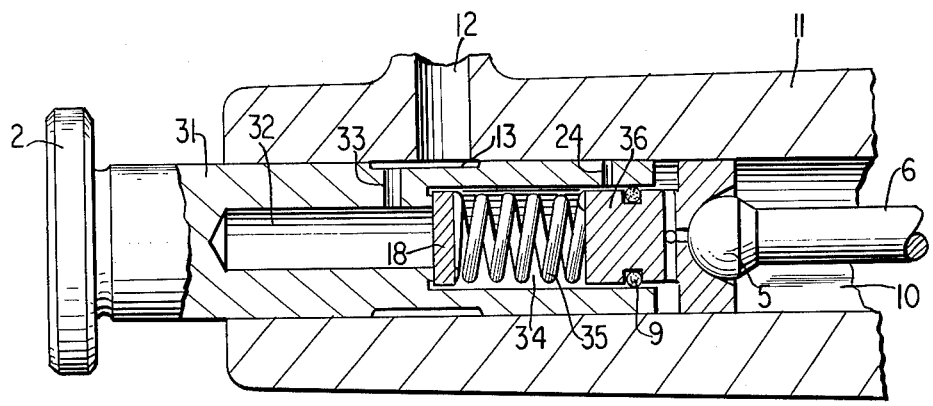

FIG. 5 shows a structurally particularly simple embodiment of the valve lifter according to the present invention. In this embodiment a sleeve 31 is located in bore 10 of the engine block 11, said sleeve being made in a single piece with plate 2. The bore of sleeve 31 comprises antechamber 32 in its botttom, said antechamber being supplied with oil from the lubricating oil circulation system through bores 12 and 33. Pressure chamber 34 is adjacent to antechamber 32 on the open side of sleeve 31, said pressure chamber being closed off from antechamber 32 by valve plate 18 which is under the action of a coil spring 35.

The bore in sleeve 31, which is enlarged to form pressure chamber 34, at the same time comprising sliding element 36 which at the same time also forms the ball socket for receiving the spherical end 5 of the valve stem 6. Between sliding element 36 and the wall of pressure chamber 34 there is an annular rope seal ring 9 as in the previously described embodiments. A feed bore 24 is provided in the wall of pressure chamber 34, which is covered by sliding element 36 so that a throttle slit is formed. Coil spring 35 in this embodiment serves not only to keep valve plate 16 in the closed position but at the same time also to force apart the two principal elements 31 and 36 which form the valve lifter.

Figure 6:
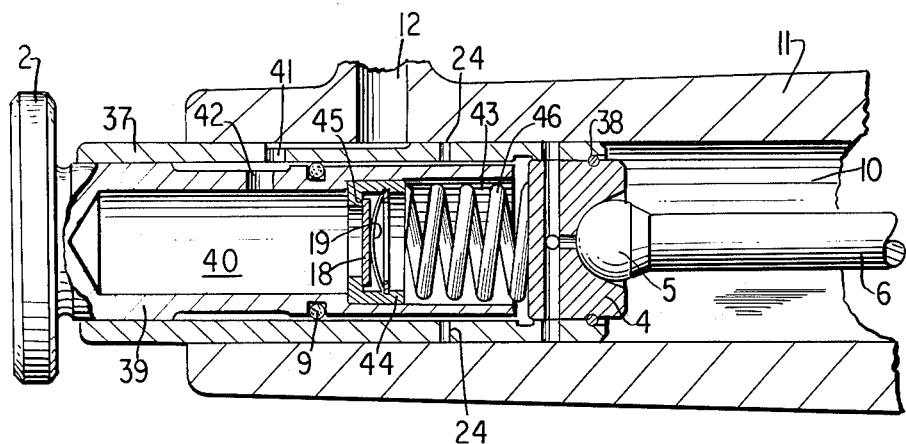

In the embodiment according to FIG. 6, a sleeve 37 is located in bore 10 of engine block 11, said sleeve being rigidly connected with ball socket 4 by means of ring 38. Within the different sleeve 37, another sleeve 39 is longitudinally slidably mounted, which in turn is connected into a single piece with valve cam plate 2. The bore of sleeve 39 comprises antechamber 40 in its lower end. Oil from the lubricating circulation system can pass from channel 12 through bore 41 in sleeve 37 and from bore 42 in sleeve 39.

Adjacent to antechamber 40 toward the open end of sleeve 39 is pressure chamber 43 which is closed off from the antechamber in known fashion by valve plate 18 and leaf spring 19. The check valve consisting of the two parts 18 and 19 is located in this embodiment in an additional casing 44 which at the same time forms the valve seat for valve plate 18 on a flange 45. A coil spring 46 is located in known fashion in the pressure chamber, which forces the two principal parts of the valve lifter apart. The seal of the two sleeves 37 and 39 with respect to each other is in this case also effected by an annular rope ring 9. In the area of pressure chamber 43, the sleeve 37 comprises several vent bores 24 distributed over the circumference, which are covered by the end of sleeve 39 so that a throttle slit results.

Figure 7:
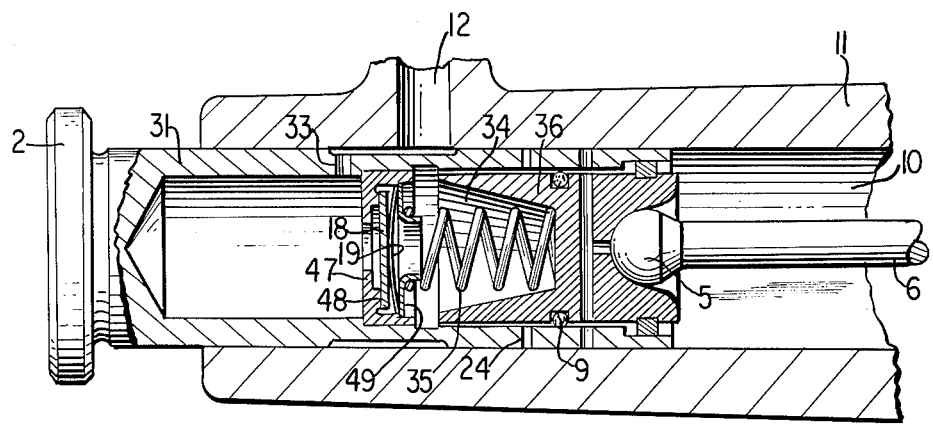

The embodiment of the valve lifter according to the present invention shown in FIG. 7 essentially corresponds to that shown in FIG. 5. The essential difference resides merely in the fact that the check valve consisting of valve plate 18 and leaf spring 19 is located in a separate sleeve 47 which comprises on one side a flange on which seat ring 48 is positioned. This sleeve 47 together with parts 18 and 19 is a preassembled unit, where a sheet metal element 49 serves as an abutment for leaf spring 19, said unit being pressed into casing 47. The sheet metal element 49 serves at the same time as an abutment for spring 35 which has the tendency to force apart the two principal elements 31 and 36 of the valve lifter.

Figure 8:
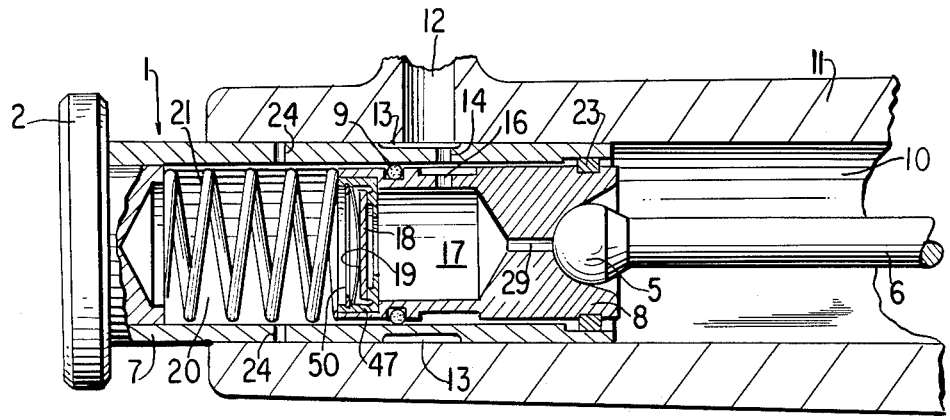
Figure 9:
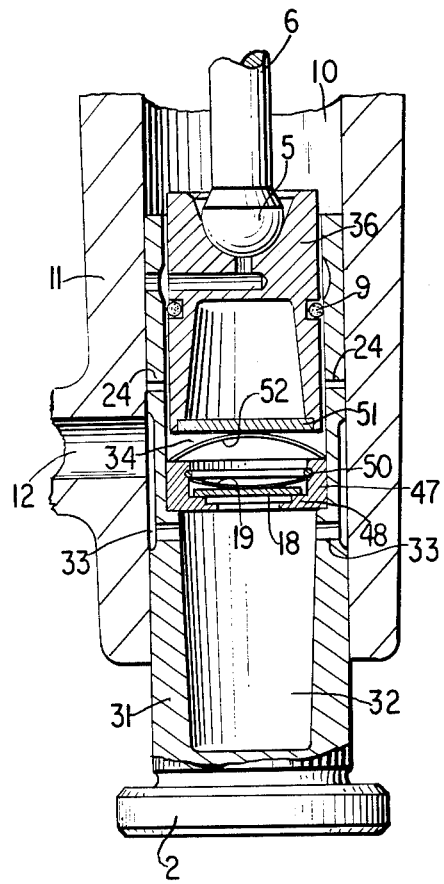

On the other hand, the valve lifter embodiment shown in FIG. 8 corresponds in its basic construction to the embodiment shown in FIG. 3. In contrast to the embodiment of FIG. 3, however, the check valve is also located in its own casing 47, as in the embodiment of FIG. 7, but in this case a spring washer 50 serves as an abutment for leaf spring 19. Moreover, in contrast to the embodiment shown in FIG. 3, the filter 30 in antechamber 17 is omitted. However, it would be readily possible to provide such a filter also in this embodiment.

Whereas the above described embodiments had as their object valve lifters which were especially suited for horizontal or slightly inclined installation, because of the arrangement selected for the vent bores, the embodiments shown in FIGS. 9 and 10 relate to valve lifters which are specially designed for the requirements in connection with vertical installation.

The basic construction of the valve lifter shown in FIG. 9 corresponds to the valve lifter embodiment shown in FIG. 7. Only a few changes have been made which make it possible to use this valve lifter embodiment in vertical position.

As already explained in detail above, it is necessary that in all of these valve lifter embodiments the vent bores be located in the uppermost position of the pressure chamber so that air which may be present in the oil can actually escape through these bore holes. If the valve lifter according to FIG. 7 were installed in a vertical position, however, the air which would separate from the oil in the pressure chamber would collect in the conical bore of the sliding element 36 and could not escape therefrom. For this reason this bore of sliding element 36 in the valve lifter embodiment of FIG. 9 is closed at its lower end by plate 51 which is pressed into the bore. Thus, the pressure chamber in this valve lifter lies between this plate 51 and the valve plate 18. Vent bores 24 are located in the wall of element 31 at such a location that they are covered by part 36 so that an additional throttling effect results. In addition, plate 51 in this embodiment serves at the same time as an abutment for leaf spring 52 which is supported on the other side by sleeve 47 which comprises the check valve and has the tendency to force apart the two principal elements 31 and 36 of the valve lifter.

The embodiment shown in FIG. 10 again corresponds in basic structure to the valve lifter shown in FIG. 9. The hollow chamber located in sliding element 36, however, is here not closed off by a plate but rather itself forms the pressure chamber 34. The axially directed bore 53 served as the vent aperture, bore 53 at the same time providing a channel for supplying the spherical end of valve stem 6 with lubricating oil. For throttling of this vent bore a plate 54 is mounted at its lower end, which is held by a leaf spring 55 against the end of the bore so that a small slit remains when the oil in pressure chamber 34 is not under pressure.

During the lift stroke of the valve, that is, when the oil in pressure chamber 34 is under pressure, however, the plate 54 is pressed against the end of bore 53 so that an absolutely tight seal is assured. The check valve in the embodiment of FIG. 10 is fashioned as a ball valve. The valve seat 57 is located in casing 56 which is provided with a central bore. A ball 58 abuts against valve seat 57, said ball being guided in sheet metal element 59 and pressed against the valve seat 57 by spring 60. The part 59 itself is held in casing 56 by spring 61 which forces apart the two principal elements 31 and 36 of the valve lifter.

For compensation of the varying viscosity of the oil in the valve lifter embodiment of FIG. 1, the sleeve 25, which forms an annular throttle slit together with the wall of casing 7, may be manufactured of a material which has a greater coefficient of expansion with the material of which casing 7 is made. In this manner a constriction of the throttle slit is achieved at increasing temperature of the oil, whereby a constant flow of oil through the vent bores 24 is ensured.

FIG. 11 shows a variation of the temperature compensating embodiment of FIG. 1, which resides in that instead of sleeve 25 a sleeve 29 is used which consists of a bimetallic combination and is provided with a slit at one place along its circumference. A pin 30 extends into the slit, the pin being pressed into a radially directed bore of casing 7. This pin 30 prevents the longitudinal slit of sleeve 29 from rotating to cover one of the vent bores 24. In this embodiment sleeve 29 also expands upon heating of the oil so that the throttle slit narrows.

Finally, FIG. 12 shows another embodiment which differs structurally somewhat from the previously described embodiments. However, comparable parts are indicated by the same reference numerals as in FIGS. 1 and 2. Instead of the valve plate 18 as in FIG. 1, a sphere 31 is used in this embodiment. The most essential difference resides actually in that the vent bore 24 is not located in casing 7 but rather axially in plate 2. This has the advantage that the oil draining through this vent bore can serve at the same time for lubrication of the valve cam. Plate 2 is provided with a bore 32 in which a massive cylindrical element 33 is located, whereby a throttle slit is formed between the surface of part 33 and the wall of bore 32. The cylindrical part 33 is made of a material which has a greater coefficient of expansion than the material of which plate 2 is made, so that the throttle slit formed between these two parts is constricted upon heating of the coil.

The present invention is not limited by the embodiments here illustrated. More particularly, it is also possible to exchange individual structural elements for each other in the various embodiments shown in the drawings.

When it is said in the specification and in the claims that the valve lifter is to be supplied with hydraulic oil from the oil circulation system of the engine, this is not intended to bring out that the invention is limited to valve lifter embodiments in which the oil required for their operation is actually withdrawn from the lubricating oil circulating system of the engine in which they are installed. It is of course also possible to supply the valve lifters from a separate oil circulation system without changing anything in the concept of the present invention.

We claim:

1. Self-adjusting hydraulic valve lifter for piston engines comprising two longitudinally slidable telescoped cylindrical members closed at their extreme ends defining between them a pressure chamber, check valve means connecting said pressure chamber with an antechamber located in one of said cylindrical members, radially directed bore holes through the cylindrical wall of said antechamber, means to provide a hydraulic fluid to said antechamber through said bore holes, said cylindrical members being telescoped into each other with relatively large clearance, elastic sealing elements sealing off said cylindrical members with respect to each other, at least one vent bore from said pressure chamber to the outside of the valve lifter, an additional structural element adjacent the wall of the pressure chamber in the area of the vent bore to form an annular slit between the wall of the pressure chamber and said additional structural element, said slit being of such a width that additional throttling of the vent bore results, said additional structural element being of a heat expandable material whereby it effects a constriction of the throttle slit upon heating.

2. The valve lifter of claim 1 wherein the hydraulic fluid is provided from the lubricating oil system of the engine.

3. Valve lifter according to claim 1, wherein the vent bore is located in the wall of the pressure chamber at a location which, in the installed position of the valve lifter, is in the uppermost end of the pressure chamber.

4. Valve lifter according to claim 1, comprising in addition means for rotating the valve lifter and wherein the vent bore is located in the wall of the pressure chamber at a location which, in the substantially horizontally installed position of the valve lifter, is in the uppermost end of the pressure chamber, and as a result of the revolution of the valve lifter in operation, repeatedly returns at short time intervals to the upper end of the pressure chamber.

5. Valve lifter according to claim 1, wherein the structural element covering the vent bore is adapted to lie up against the vent bore during the valve lift stroke under the influence of the fluid pressure existing in the pressure chamber, and thereby closes off the vent bore.

6. Valve lifter according to claim 1, wherein the structural element covering the vent bore is formed by a sleeve located within the pressure chamber.

7. Valve lifter according to claim 6, wherein the sleeve is made elastic so that it lies up against the inner wall of the pressure chamber during the valve lift stroke under the influence of the fluid pressure in the pressure chamber and thereby closes off the vent bore.

8. Valve lifter according to claim 6, wherein the sleeve is positioned in the pressure chamber so that it can displace itself in operation by a small amount in a longitudinal direction.

9. Valve lifter according to claim 1, wherein the elastic sealing elements which form the seal between the two cylindrical members which make up the valve lifter are annular rope rings.

10. Valve lifter according to claim 1, wherein the check valve means located between the antechamber and the pressure chamber is mounted in a separate casing, having a flange which forms the valve seat.

11. Valve lifter according to claim 1, characterized in that the check valve means is a preassembled valve unit ready for installation comprising a casing together with a valve plate or ball and a tension spring.

12. Valve lifter according to claim 1, wherein the vent bore is located in the cylindrical wall of the pressure chamber and is covered by a sleeve which has a greater coefficient of expansion than the material of which the valve lifter is made to form a throttle slit.

13. Valve lifter according to claim 12, wherein said sleeve is made of a bimetallic combination, comprising a longitudinal slit at one place along its circumference and comprises means to prevent rotation relative to the part of the valve lifter which defines the pressure chamber.

14. Valve lifter according to claim 1, wherein a massive cylindrical element is mounted in an axial bore of a valve lifter part, said cylindrical element being of such dimensions that a throttle slit is formed between the wall of the bore and the surface of the cylindrical element, said cylindrical element having a higher coefficient of expansion than the surrounding valve lifter part.

References Cited by the Examiner
UNITED STATES PATENTS

| | | | |
|---|---|---|---|
| 1,792,836 | 2/1931 | Handwerker | 123—90 |
| 1,815,445 | 7/1931 | Noble | 123—90 |
| 2,090,795 | 8/1937 | Johnson | 123—90 |
| 2,541,953 | 2/1951 | Banker | 123—90 |
| 2,577,852 | 12/1951 | Hufferd | 123—90 |

MARK NEWMAN, *Primary Examiner.*

FRED E. ENGELTHALER, *Examiner.*

A. L. SMITH, *Assistant Examiner.*